Figure 3:
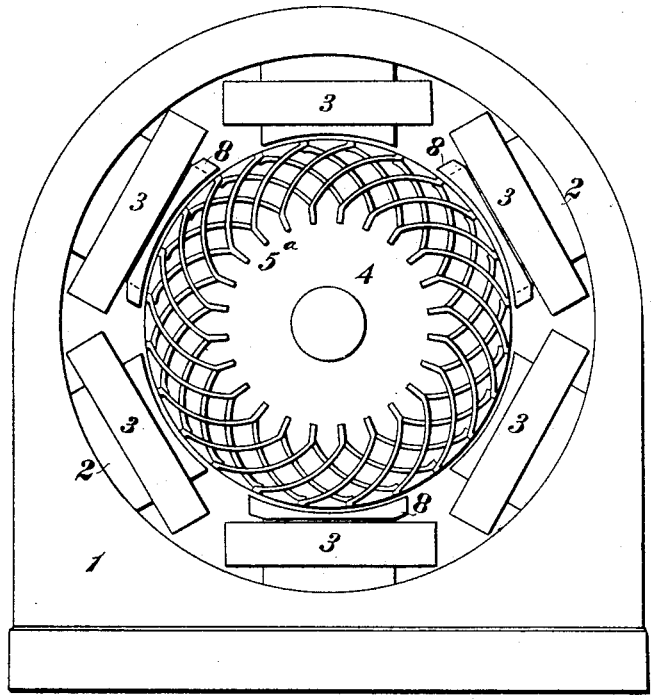

(No Model.) 2 Sheets—Sheet 1.
B. G. LAMME.
DIRECT CURRENT GENERATOR.
No. 588,279. Patented Aug. 17, 1897.
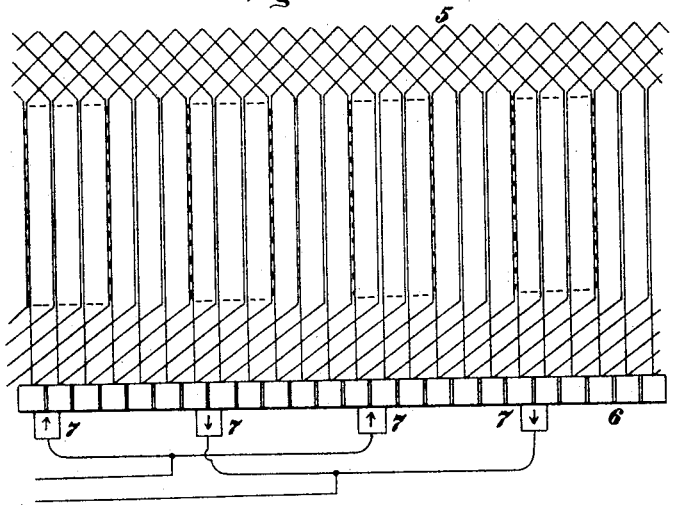
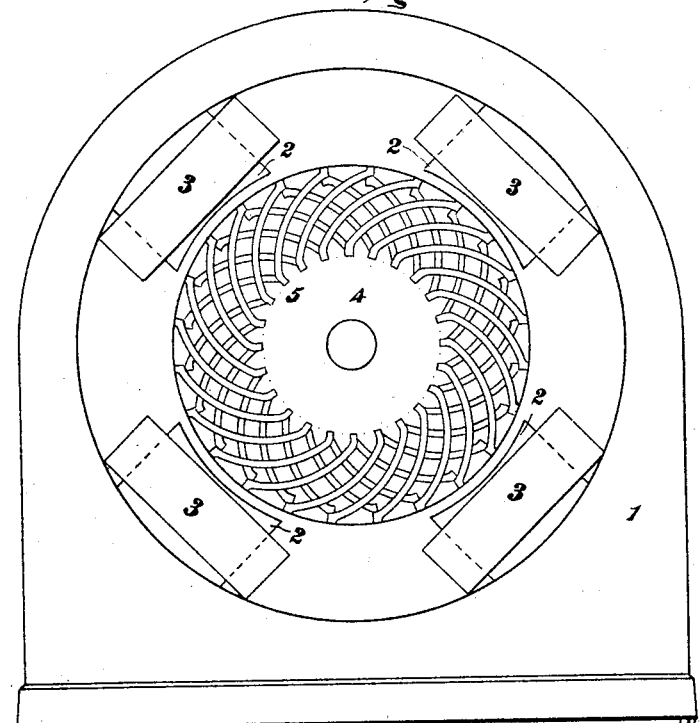
WITNESSES:  
INVENTOR  
Benjamin G. Lamme  
BY  
H. G. Carr  
ATTORNEY.

(No Model.) 2 Sheets—Sheet 2.

B. G. LAMME.
DIRECT CURRENT GENERATOR.

No. 588,279. Patented Aug. 17, 1897.

WITNESSES:

INVENTOR
Benjamin G. Lamme
BY
W. G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

DIRECT-CURRENT GENERATOR.

SPECIFICATION forming part of Letters Patent No. 588,279, dated August 17, 1897.

Application filed May 8, 1896. Serial No. 590,665. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Direct-Current Electrical Machines, (Case No. 700,) of which the following is a specification.

My invention relates to dynamo-electric machines, and more particularly to multipolar direct-current machines having drum-armatures of that type in which the coils are located in slots in the core.

My invention has for its object to provide a machine of the general character specified in which self-induction in the armature-coils, which are short-circuited at the brushes, shall be reduced to the smallest practicable limits, and one in which sparking is substantially obviated without involving delicate and accurate adjustment of the commutator-brushes.

It is generally understood that satisfactory commutation of currents of large volume involves the generation of a counter electromotive force in the coils which are short-circuited at the brushes. In order to secure this result in machines of usual construction, the brushes are moved forward until both sides of the short-circuited coils are located in the fringe of the magnetic field. If the brushes are moved a greater distance, so that the short-circuited coils are in a field of full strength, the counter electromotive force of the coil will be in excess of that desired and the commutation will not be satisfactory. In machines in which the magnetic field is very strong and the air-gap between the armature and pole-pieces is small the magnetic fringe may be very narrow, so narrow in fact that the distance between the position of no field and that of full field may be so small as to necessitate a very delicate adjustment of the brushes in order to secure the desired counter electromotive force in the short-circuited coils. If, however, each of the armature-coils be of such dimensions as to embrace a portion of the periphery of the core which is either greater or less in width than the distance between the centers of adjacent field-magnet pole-pieces, one side only of each short-circuited coil may be located in the field, and the brushes may be shifted a sufficient distance to bring it into the field of full strength without impairing the commutation. Such being the case, it will be readily understood that a relatively wide range of movement of the brushes backward or forward is possible without substantially varying the counter electromotive force in the short-circuited coils. Furthermore, if the coil has only one side in the field of full strength and the entire load be thrown off the machine, the short-circuiting effect will remain approximately the same as before, provided the machine is designed for a small distortion of the field by the armature-current. On the other hand, with the usual construction of machine in which both sides of the short-circuited coil are located in a field of substantially half the full strength the fringe may rise in strength to almost that of the full field when the load is thrown off, and the short-circuiting effect will consequently be very nearly doubled.

Substantially the same result may be secured as regards the adjustment of the commutator-brushes if instead of varying the winding of the armature from that usually employed the field-magnet be provided with means whereby the width of the fringe at alternate pole-pieces is increased in width.

Figure 4:
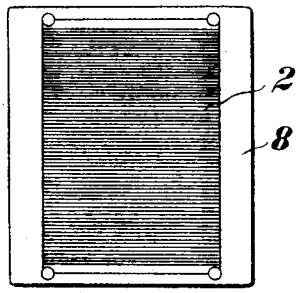

In the accompanying drawings, Figure 1 is a rear end elevation, partially diagrammatic, of a machine constructed in accordance with my invention; and Fig. 2 is a diagrammatic development of the armature and the commutator of such machine. Fig. 3 is a view similar to Fig. 1 of a modification. Fig. 4 is a face view of one of the pole-pieces of the machine shown in Fig. 3 provided with a shoe.

Referring now to Figs. 1 and 2 of the drawings, 1 is the field-magnet frame of the machine, 2 the pole-pieces, and 3 the field-magnet coils. 4 is the armature, which is of usual construction except as regards the dimensions of the generating-coils 5 with reference to the field-magnet pole-pieces. 6 is the commutator-cylinder, and 7 the brushes coöperating therewith. The armature-coils 5 are located in slots in the periphery of the core, as indicated in Fig. 1, there being two conductors in each slot, and each of these coils embraces a portion of the periphery of the armature-core which is less than the distance between the centers of the field-magnet pole-pieces. With such a construction it will be readily seen that when the side of any coil is just coming under the edge of a pole-piece the other side will be either completely under the adjacent pole-piece, and consequently subject to the full strength of the magnetic field, or else it will be in a position of no magnetic field. This construction, as has already been pointed out, renders it possible to so adjust the commutator-brushes that the coil which is short-circuited through any particular brush will have one side in either a partial or a full magnetic field and the other side in a position of no field, and that a considerable movement of the brushes may be effected in either direction without materially affecting this condition of the coil. A further important advantage incident to this construction resides in the fact that neither side of a short-circuited coil lies in the same slot with a side of any other short-circuited coil, whereas in the usual construction, in which the space between the sides of each coil is equal to the distance between the centers of adjacent pole-pieces, adjacent sides of two short-circuited coils lie in the same slot, a construction which is productive of a considerable amount of self-induction and consequent sparking at the brushes. With the arrangement such as I have shown in Figs. 1 and 2 above described this self-induction, which has heretofore been present by reason of the relative location of the adjacent sides of the short-circuited coils, is reduced by about one-half.

The improved results incident to the construction above described may also be obtained by employing coils which embrace spans of greater width than the distance between the centers of adjacent field-magnet pole-pieces, and I regard such a construction as within my invention.

Referring now to Fig. 3, the field-magnet frame 1, pole-pieces 2, and coils 3 are substantially the same as the corresponding parts in Fig. 1, except that the field-magnet has six pole-pieces instead of four. In the machine shown in Fig. 3, however, the armature 4 is provided with coils 5ª, each of which embraces a portion of the armature-core which is equal to the distance between the centers of adjacent pole-pieces, this being the usual construction. In order to secure a relation between the short-circuited armature-coils and the field which will obviate the necessity of an accurate adjustment of the brushes with this old form of machine, I provide the alternate pole-pieces with magnetic pole-shoes 8. These shoes, as shown in Fig. 5, surround the inner ends of the pole-pieces and are preferably flush with their faces. With this arrangement the magnetic field will be so adjusted with reference to the armature-coils that substantially the same variation in adjustment of the brushes may be effected as that hereinbefore described without disturbing the relation between the short-circuited coils and the magnetic field.

I claim as my invention—

1. The combination with the field-magnet of a direct-current electrical machine, of a commutator and a slotted armature-core provided with a winding comprising a set of coils each of which embraces a space which is less than the distance between the centers of adjacent field-magnet pole-pieces and has its terminals connected to segments of the commutator-cylinder which are spanned by brushes of the same sign, whereby the desired counter electromotive force in the short-circuited coils may be readily secured.

2. In a direct-current electrical machine, a multipolar field-magnet in combination with a commutator and a drum-armature provided with a set of coils the distance between the sides of each of which is either greater or less than the distance between the corresponding edges of adjacent pole-faces, and each of which is connected at its ends to segments of the commutator-cylinder which are spanned by brushes of the same sign, whereby the desired counter electromotive force in the short-circuited coils may be readily secured.

3. A direct-current electrical machine having an armature-core provided with slots and a winding comprising two sets of coils located in said slots, the sides of the several coils which are short-circuited at the brushes being in separate slots with reference to each other, whereby the self-induction in such coils is reduced.

In testimony whereof I have hereunto subscribed my name this 5th day of May, A. D. 1896.

BENJ. G. LAMME.

Witnesses:
WESLEY G. CARR,
HUBERT C. TENER.